United States Patent
Jaluka et al.

(10) Patent No.: US 8,468,042 B2
(45) Date of Patent: Jun. 18, 2013

(54) METHOD AND APPARATUS FOR DISCOVERING AND UTILIZING ATOMIC SERVICES FOR SERVICE DELIVERY

(75) Inventors: Rajesh Jaluka, Poughkeepsie, NY (US); Santhosh B. Kumaran, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1542 days.

(21) Appl. No.: 11/446,511

(22) Filed: Jun. 5, 2006

(65) Prior Publication Data
US 2007/0282655 A1    Dec. 6, 2007

(51) Int. Cl.
G06Q 40/00    (2006.01)
(52) U.S. Cl.
USPC ........................................ 705/7.11; 705/7.42
(58) Field of Classification Search
USPC .......................................... 705/7.11, 7.42, 8
See application file for complete search history.

(56) References Cited

U.S. PATENT DOCUMENTS

| | | |
|---|---|---|
| 4,835,372 A | 5/1989 | Gombrich et al. |
| 5,049,873 A | 9/1991 | Robins et al. |
| 5,504,921 A | 4/1996 | Dev et al. |
| 5,634,009 A | 5/1997 | Iddon et al. |
| 5,724,262 A | 3/1998 | Ghahramani |
| 5,734,837 A | 3/1998 | Flores et al. |
| 5,765,138 A | 6/1998 | Aycock et al. |
| 5,774,661 A | 6/1998 | Chatterjee et al. |
| 5,826,239 A | 10/1998 | Du et al. |
| 5,850,535 A | 12/1998 | Maystrovsky et al. |
| 5,870,545 A | 2/1999 | Davis et al. |
| 5,884,302 A | 3/1999 | Ho |
| 5,907,488 A | 5/1999 | Arimoto et al. |
| 5,937,388 A | 8/1999 | Davis et al. |
| 6,049,776 A | 4/2000 | Donnelly et al. |
| 6,131,085 A | 10/2000 | Rossides |
| 6,249,769 B1 | 6/2001 | Ruffin et al. |
| 6,259,448 B1 | 7/2001 | McNally et al. |
| 6,263,335 B1 | 7/2001 | Paik et al. |
| 6,308,208 B1 | 10/2001 | Jung et al. |
| 6,339,838 B1 | 1/2002 | Weinman, Jr. |

(Continued)

FOREIGN PATENT DOCUMENTS
WO    2007143516    12/2007

OTHER PUBLICATIONS

M.D. Harrison, P.D. Johnson and P.C. Wright. "Relating the automation of functions in multi-agent control systems to a system engineering representation." Department of Computer Science, University of York, Heslington, York. UK. Aug. 13, 2004.*

(Continued)

*Primary Examiner* — Thomas Dixon
*Assistant Examiner* — Benjamin S Fields
(74) *Attorney, Agent, or Firm* — Cahn & Samuels, LLP

(57) ABSTRACT

A method, apparatus and computer readable medium for identifying and partitioning atomic services in an information technology (IT) environment are included within the invention. More specifically, the invention provides a method and system for identifying service boundaries and partitioning services into atomic services based on the services boundaries. In order to more efficiently provide services in an IT environment, this invention in at least one embodiment utilizes a method of partitioning services into atomic services based on natural services boundaries such that those atomic services may be standardized and reused as needed.

26 Claims, 6 Drawing Sheets

U.S. PATENT DOCUMENTS

| Patent No. | Date | Inventor |
|---|---|---|
| 6,363,384 B1 | 3/2002 | Cookmeyer, II et al. |
| 6,438,594 B1 | 8/2002 | Bowman-Amuah |
| 6,453,269 B1 | 9/2002 | Quernemoen |
| 6,473,794 B1 | 10/2002 | Guheen et al. |
| 6,496,209 B2 | 12/2002 | Horii |
| 6,523,027 B1 | 2/2003 | Underwood |
| 6,526,387 B1 | 2/2003 | Ruffin et al. |
| 6,526,392 B1 | 2/2003 | Dietrich et al. |
| 6,526,404 B1 | 2/2003 | Slater et al. |
| 6,618,730 B1 | 9/2003 | Poulter et al. |
| 6,675,149 B1 | 1/2004 | Ruffin et al. |
| 6,738,736 B1 | 5/2004 | Bond |
| 6,763,380 B1 | 7/2004 | Mayton et al. |
| 6,789,101 B2 | 9/2004 | Clarke et al. |
| 6,810,383 B1 | 10/2004 | Loveland |
| 6,865,370 B2 | 3/2005 | Ho et al. |
| 6,879,685 B1 | 4/2005 | Peterson et al. |
| 6,907,549 B2 | 6/2005 | Davis et al. |
| 6,970,803 B1 | 11/2005 | Aerdts et al. |
| 6,988,088 B1 | 1/2006 | Miikkulainen et al. |
| 6,988,132 B2 | 1/2006 | Horvitz |
| 7,010,593 B2 | 3/2006 | Raymond |
| 7,039,606 B2 | 5/2006 | Hoffman et al. |
| 7,089,529 B2 | 8/2006 | Sweitzer et al. |
| 7,114,146 B2 | 9/2006 | Zhang et al. |
| 7,177,774 B1 | 2/2007 | Brown et al. |
| 7,236,966 B1 | 6/2007 | Jackson et al. |
| 7,260,535 B2 | 8/2007 | Galanes et al. |
| 7,293,238 B1 | 11/2007 | Brook et al. |
| 7,315,826 B1 | 1/2008 | Guheen et al. |
| 7,364,067 B2 | 4/2008 | Steusloff et al. |
| 7,403,948 B2 | 7/2008 | Ghoneimy et al. |
| 7,412,502 B2 | 8/2008 | Fearn et al. |
| 7,467,198 B2 | 12/2008 | Goodman et al. |
| 7,472,037 B2 | 12/2008 | Brown et al. |
| 7,490,145 B2 | 2/2009 | Sylor et al. |
| 7,562,143 B2 | 7/2009 | Fellenstein et al. |
| 7,580,906 B2 | 8/2009 | Faihe |
| 7,599,308 B2 | 10/2009 | Laver et al. |
| 7,707,015 B2 | 4/2010 | Lubrecht et al. |
| 7,802,144 B2 | 9/2010 | Vinberg et al. |
| 7,818,418 B2 | 10/2010 | Bansal et al. |
| 2001/0047270 A1 | 11/2001 | Gusick et al. |
| 2002/0019837 A1 | 2/2002 | Balnaves |
| 2002/0055849 A1 | 5/2002 | Georgakopoulos et al. |
| 2002/0091736 A1 | 7/2002 | Wall |
| 2002/0099578 A1 | 7/2002 | Eicher et al. |
| 2002/0111823 A1 | 8/2002 | Heptner |
| 2002/0140725 A1 | 10/2002 | Horii |
| 2002/0147809 A1 | 10/2002 | Vinberg |
| 2002/0161875 A1 | 10/2002 | Raymond |
| 2002/0169649 A1 | 11/2002 | Lineberry et al. |
| 2002/0186238 A1 | 12/2002 | Sylor et al. |
| 2003/0004746 A1 | 1/2003 | Kheirolomoom et al. |
| 2003/0018629 A1 | 1/2003 | Namba |
| 2003/0018771 A1 | 1/2003 | Vinberg |
| 2003/0033402 A1 | 2/2003 | Battat et al. |
| 2003/0065764 A1 | 4/2003 | Capers et al. |
| 2003/0065805 A1 | 4/2003 | Barnes |
| 2003/0097286 A1 | 5/2003 | Skeen |
| 2003/0101086 A1 | 5/2003 | San Miguel |
| 2003/0154406 A1 | 8/2003 | Honarvar et al. |
| 2003/0172145 A1 | 9/2003 | Nguyen |
| 2003/0187719 A1 | 10/2003 | Brocklebank |
| 2003/0225747 A1 | 12/2003 | Brown et al. |
| 2004/0024627 A1 | 2/2004 | Keener |
| 2004/0158568 A1* | 8/2004 | Colle et al. ..................... 707/100 |
| 2004/0172466 A1 | 9/2004 | Douglas et al. |
| 2004/0181435 A9 | 9/2004 | Snell et al. |
| 2004/0186757 A1 | 9/2004 | Starkey |
| 2004/0186758 A1 | 9/2004 | Halac et al. |
| 2004/0199417 A1 | 10/2004 | Baxter et al. |
| 2005/0027585 A1 | 2/2005 | Wodtke et al. |
| 2005/0027845 A1 | 2/2005 | Secor et al. |
| 2005/0066026 A1 | 3/2005 | Chen et al. |
| 2005/0091269 A1 | 4/2005 | Gerber et al. |
| 2005/0114306 A1 | 5/2005 | Shu et al. |
| 2005/0114829 A1 | 5/2005 | Robin et al. |
| 2005/0136946 A1 | 6/2005 | Trossen |
| 2005/0138631 A1 | 6/2005 | Bellotti et al. |
| 2005/0159969 A1 | 7/2005 | Sheppard |
| 2005/0187929 A1 | 8/2005 | Staggs |
| 2005/0192947 A1* | 9/2005 | Mischke ........................... 707/3 |
| 2005/0203917 A1 | 9/2005 | Freeberg et al. |
| 2005/0223299 A1 | 10/2005 | Childress et al. |
| 2005/0223392 A1 | 10/2005 | Cox et al. |
| 2005/0254775 A1 | 11/2005 | Hamilton et al. |
| 2006/0067252 A1 | 3/2006 | John et al. |
| 2006/0069607 A1 | 3/2006 | Linder |
| 2006/0112036 A1 | 5/2006 | Zhang et al. |
| 2006/0112050 A1 | 5/2006 | Miikkulainen et al. |
| 2006/0129906 A1 | 6/2006 | Wall |
| 2006/0168168 A1 | 7/2006 | Xia et al. |
| 2006/0178913 A1 | 8/2006 | Lara et al. |
| 2006/0184410 A1 | 8/2006 | Ramamurthy et al. |
| 2006/0190482 A1 | 8/2006 | Kishan et al. |
| 2006/0224569 A1 | 10/2006 | DeSanto et al. |
| 2006/0224580 A1 | 10/2006 | Quiroga et al. |
| 2006/0235690 A1 | 10/2006 | Tomasic et al. |
| 2006/0282302 A1 | 12/2006 | Hussain |
| 2006/0287890 A1 | 12/2006 | Stead et al. |
| 2007/0043524 A1 | 2/2007 | Brown et al. |
| 2007/0055558 A1 | 3/2007 | Shanahan et al. |
| 2007/0073576 A1 | 3/2007 | Connors et al. |
| 2007/0073651 A1 | 3/2007 | Imielinski |
| 2007/0083419 A1 | 4/2007 | Baxter et al. |
| 2007/0118514 A1 | 5/2007 | Mariappan |
| 2007/0168225 A1 | 7/2007 | Haider et al. |
| 2007/0219958 A1 | 9/2007 | Park et al. |
| 2007/0234282 A1 | 10/2007 | Prigge et al. |
| 2007/0282470 A1 | 12/2007 | Hernandez et al. |
| 2007/0282622 A1 | 12/2007 | Hernandez et al. |
| 2007/0282644 A1 | 12/2007 | Diao et al. |
| 2007/0282645 A1 | 12/2007 | Brown et al. |
| 2007/0282653 A1 | 12/2007 | Bishop et al. |
| 2007/0282659 A1 | 12/2007 | Bailey et al. |
| 2007/0282692 A1 | 12/2007 | Bishop et al. |
| 2007/0282776 A1 | 12/2007 | Jaluka et al. |
| 2007/0282876 A1 | 12/2007 | Diao et al. |
| 2007/0282942 A1 | 12/2007 | Bailey et al. |
| 2007/0288274 A1 | 12/2007 | Chao et al. |
| 2007/0292833 A1 | 12/2007 | Brodie et al. |
| 2008/0065448 A1 | 3/2008 | Hull et al. |
| 2008/0109260 A1 | 5/2008 | Roof |
| 2008/0213740 A1 | 9/2008 | Brodie et al. |
| 2008/0215404 A1 | 9/2008 | Diao et al. |
| 2009/0012887 A1 | 1/2009 | Taub et al. |
| 2011/0251866 A1* | 10/2011 | Sengupta ..................... 705/7.12 |

OTHER PUBLICATIONS

Relating the Automation of Functions in Multiagent Control Systems to a System Engineering Representation Harrison, Michael ; Johnson, Philip ; Wright, Peter Handbook of Cognitive Task Design. Jun 2003 , 503-524.*

"A Capacity Planning Model of Unreliable Multimedia Service Systems", by Kiejin Park and Sungsoo Kim, Department of Software, Anyang University, Kangwha, Incheon, South Korea, Jul. 2001.

"Tracking Your Changing Skills Inventory: Why Its Now Possible, and What It Means for Your Organization", from CIO.com, Mid 2002 IT Staffing Update, Brainbench.

"Project MEGAGRID: Capacity Planning for Large Commodity Clusters", An Oracle, Dell, EMC, Intel Joint White Paper, Dec. 2004.

BEA Systems, Inc., "BEA White Paper—BEA AquaLogic Service Bus—IT's Direct Route to SOA," printout from http://www.bea.com/content/news_events/white_papers/BEA_AQL_ServiceBus_wp.pdf, Jun. 2005.

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

PolarLake Limited, "Enterprise Service Bus (ESB) Resoure Center," printout from http://www.polarlake.com/en/html/resources/esb/, printed on Jun. 27, 2006, copyright notice dated 2006.

Sonic Software, "ESB Architecture & Lifecycle Definition," printout from http://www.sonicsoftware.com/products/sonic_esb/architecture_definition/index.ssp, printed on Jun. 26, 2006.

Internet.com (http://www.webopedia.com/TERM/m/metadata.html).

Team Quest, Capacity Planning with TeamQuest Analytic Modeling Software, printed from http://www.team/quest.com/solutions-products/solutions/planning-provis . . . on Jun. 4, 2006.

Mercury, Mercury Capacity Planning (Powered by Hyperformix), 2004.

Ganesarajah, Dinesh and Lupu Emil, 2002, Workflow-based composition of web-services: a business model or programming paradigm?, IEEE Computer Society.

"Self-Adaptive SLA-Driven Capacity Management for Internet Services", by Bruno Abrahao et al., Computer Science Department, Federal University of Minas, Gerais, Brazil, 2005.

zur Muehlen, Michael. "Resource Modeling in Workflow Applications", 1999.

* cited by examiner

METHOD AND APPARATUS FOR DISCOVERING AND UTILIZING ATOMIC SERVICES FOR SERVICE DELIVERY

I. FIELD OF THE INVENTION

This invention relates generally to providing atomic services in the field of information technology (IT) and, more specifically, to a method and system for identifying service boundaries, partitioning services into atomic services based on the services boundaries, and utilizing those atomic services.

II. BACKGROUND OF THE INVENTION

In service oriented architecture (SOA), services are primarily abstractions for building business systems. In practical terms, the design, definition and implementation of the services becomes the most important aspect of designing, building and implementing SOA systems. This leads immediately to the issue of granularity.

Granularity is the degree to which systems contain separate components, or granules. Higher granularity implies more flexibility in customizing a system, as there are more, smaller components from which to choose. Therefore, the more components in a system, or the greater the granularity, the more flexible, modular and adaptable the system is.

Given the myriad of activities being performed in a business environment, it can be difficult to define what qualifies as a service. Yet, how services are designed, defined and implemented plays a critical role in the overall efficiency of SOA systems. Furthermore, in service delivery, this is all the more significant since identifying the correct boundaries for service elements impacts the entire service delivery business.

Currently, there are no methodologies available to systemically determine service boundaries. The present invention describes a methodology for describing atomic services and then utilizing them for service delivery.

III. SUMMARY OF THE INVENTION

In an exemplary embodiment the present invention provides a method for identifying and partitioning a service into at least one atomic service in an environment to fulfill information technology services, the method including: determining whether the entire work to perform an information technology service can be automated; encapsulating all tasks into an atomic service responsive to a determination that the entire work to perform said information technology service can be automated; and storing the encapsulated tasks in an atomic services catalog.

In another exemplary embodiment the present invention provides a method for identifying and partitioning atomic services in an environment to fulfill information technology services, the method including: determining whether an entire work to perform an information technology service can be automated; determining whether all tasks to perform said work can be performed by one team having accountability and ownership of said tasks or said team having one or more logical subteams based on skills; partitioning the work to match the different skills required to perform different tasks in the work; dividing the tasks into specializations based on team, subteam or skill; encapsulating all tasks into atomic services; and storing said atomic services in an atomic services catalog.

In yet another exemplary embodiment the present invention provides an apparatus for identifying and partitioning a service into at least one atomic service in an environment to fulfill information technology services, the apparatus including: means for determining whether the entire work to perform an information technology service can be automated; means for determining whether all tasks can be performed by a person, team or subteam; means for determining whether the work can be partitioned into tasks to match the different skills required to perform different sections in the work; means for partitioning the tasks into atomic services; and means for storing said atomic services in an atomic services catalog. In a further exemplary embodiment, the apparatus further includes means for associating an interface definition for at least one service provider capable of providing one of said atomic services in said atomic services catalog.

In still another exemplary embodiment the present invention provides a method for identifying and partitioning a service into at least one atomic service in an environment to fulfill information technology services, the method including dividing a project into individual tasks, confirming the tasks can not be divided any further, converting each of the resulting tasks into a respective atomic service, and placing each atomic service into an atomic service catalog.

In still another exemplary embodiment the present invention provides a method for identifying and partitioning a service into at least one atomic service in an environment to fulfill information technology services, the method comprising: dividing a project into individual tasks based on a first consideration; designating the individual tasks as atomic services; and placing said atomic services into a catalog. The method in at least one exemplary embodiment further includes identifying service providers able to perform said atomic services. In at least one exemplary embodiment, the method includes adding identified service providers to said catalog, and linking each of said identified service providers to at least one atomic service.

Given the following enabling description of the drawings, the apparatus should become evident to a person of ordinary skill in the art.

IV. BRIEF DESCRIPTION OF THE DRAWINGS

The present invention is described with reference to the accompanying drawings, wherein.

Figure 1A:
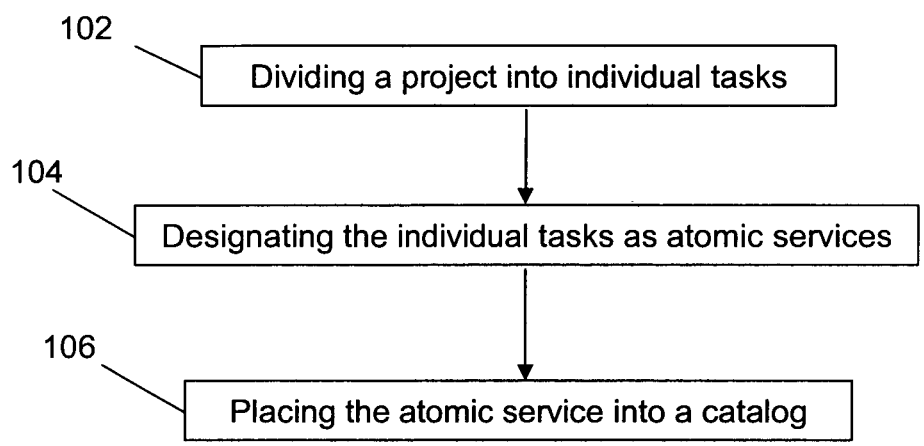
FIG. 1A illustrates a flowchart outlining an overview of an exemplary method of the present invention.
Figure 1B:
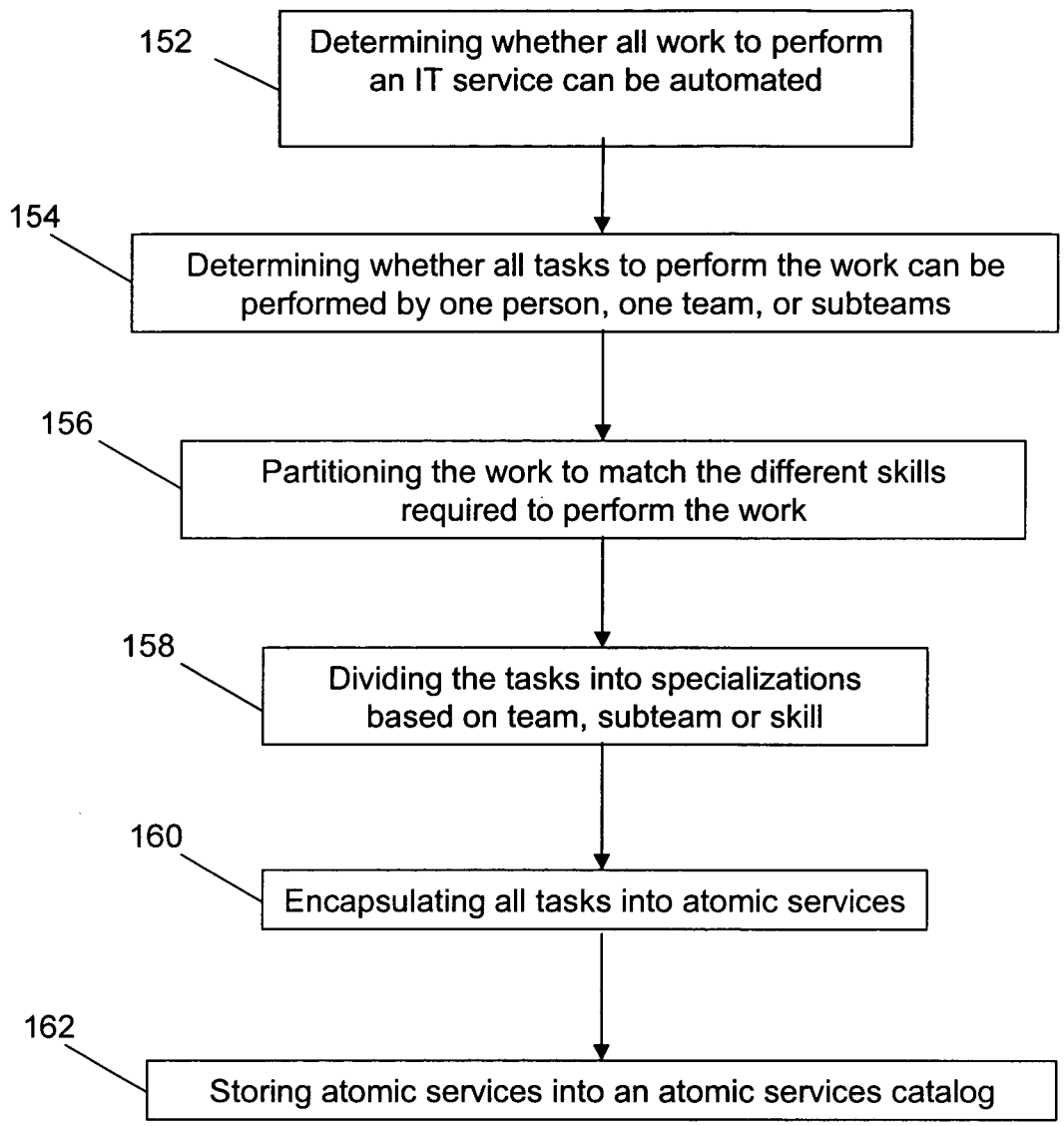
FIG. 1B illustrates a flowchart outlining an overview of an exemplary method of the present invention.
Figure 2:
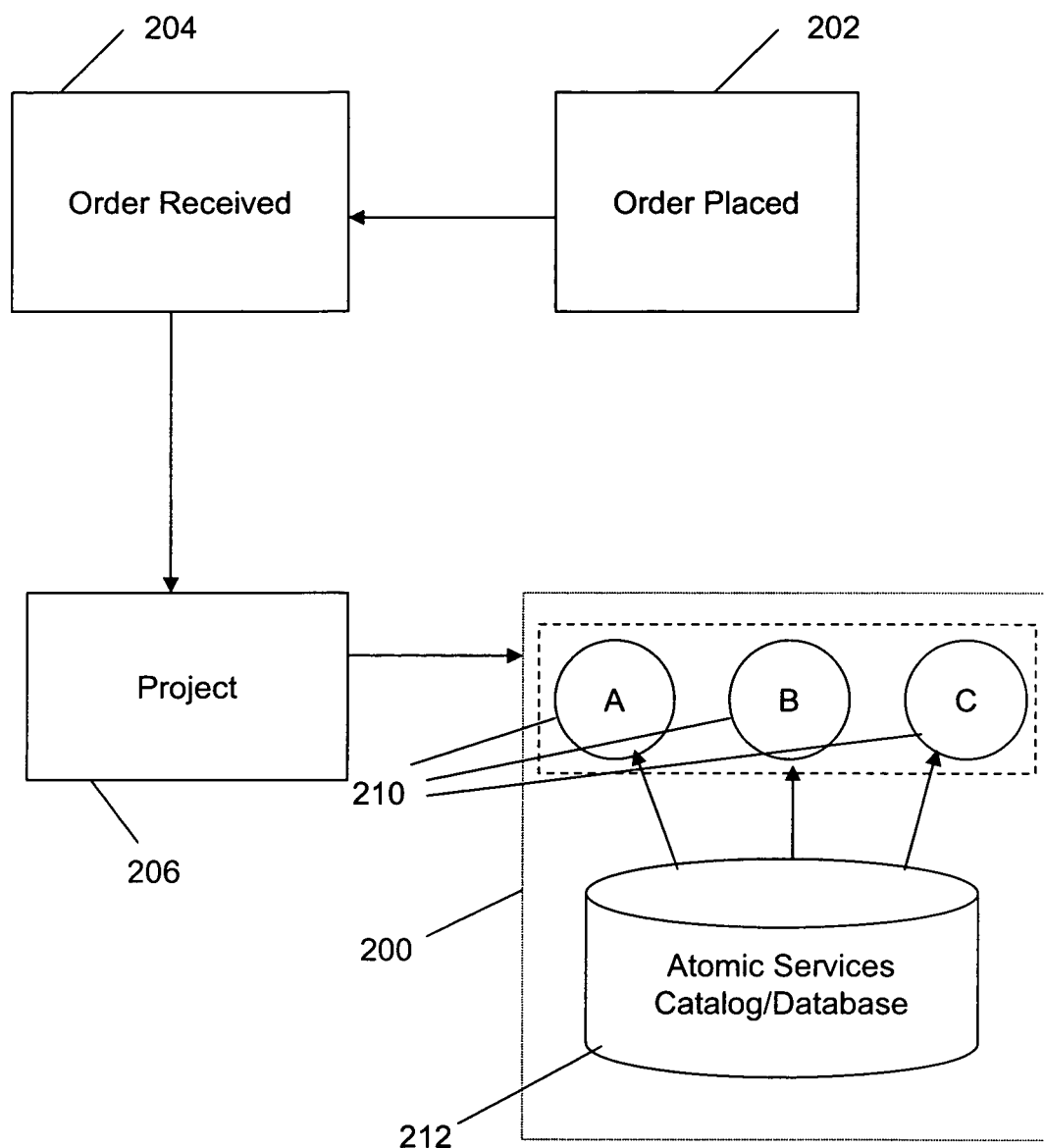
Figure 3:
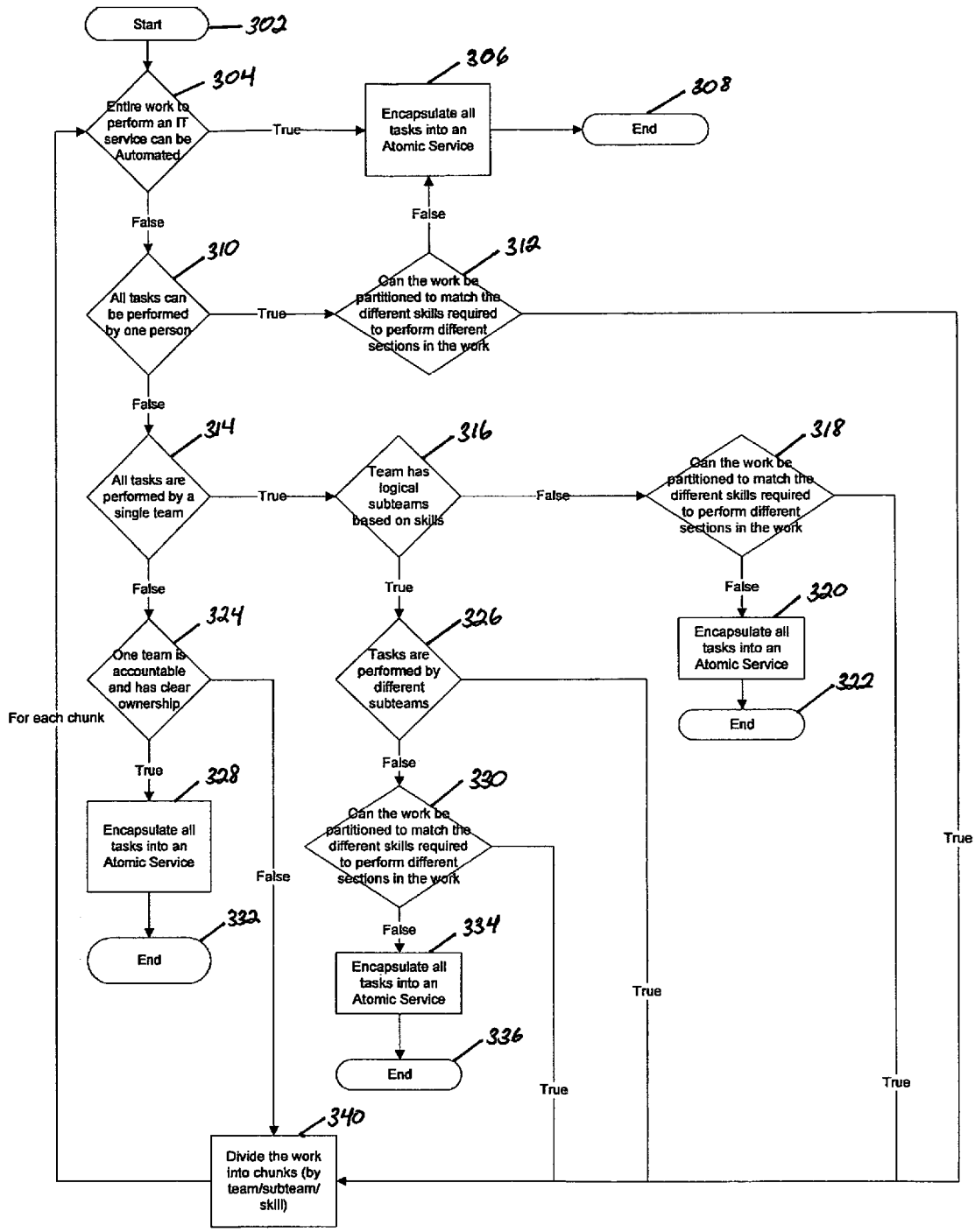
Figure 4:
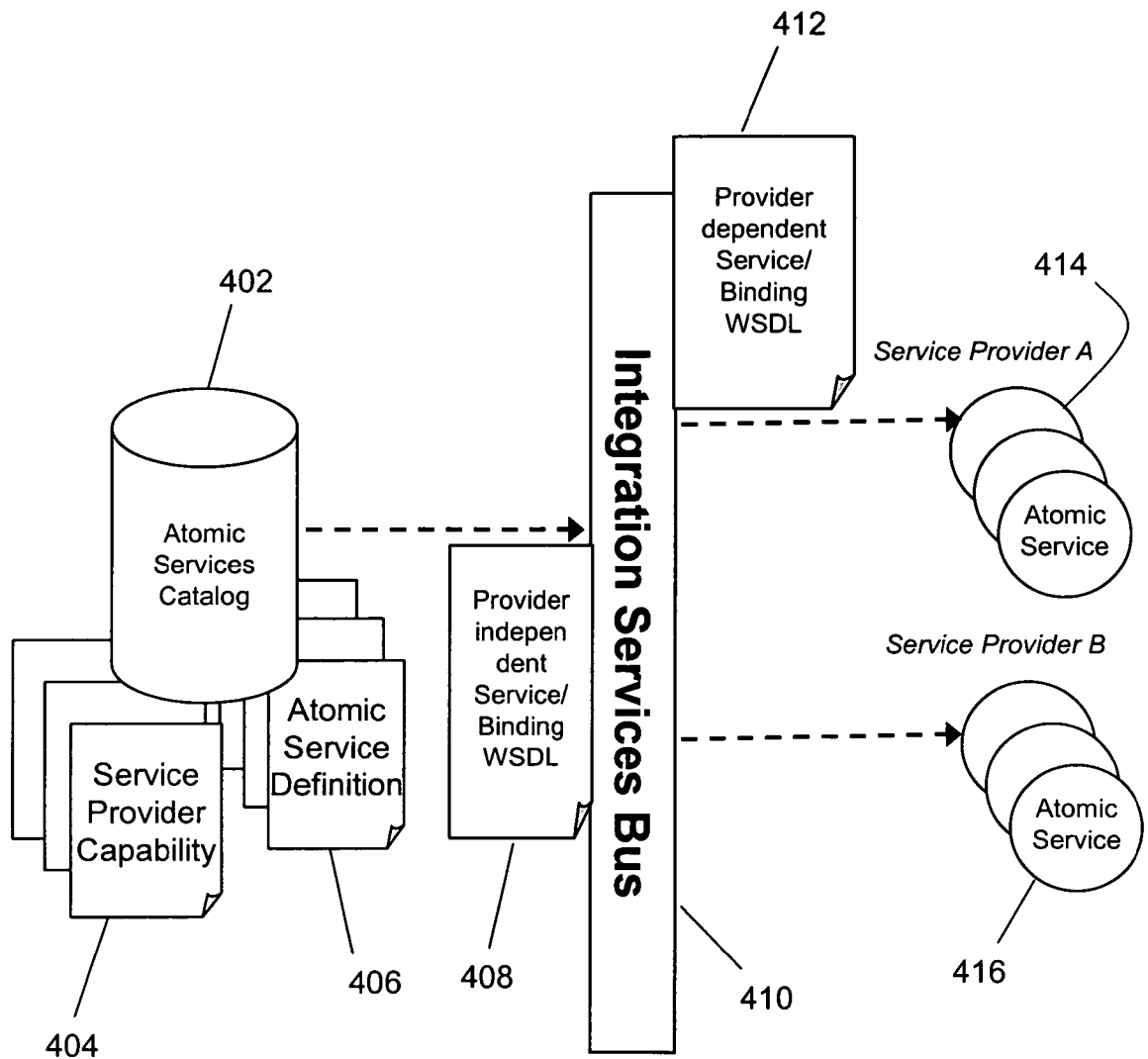
Figure 5:
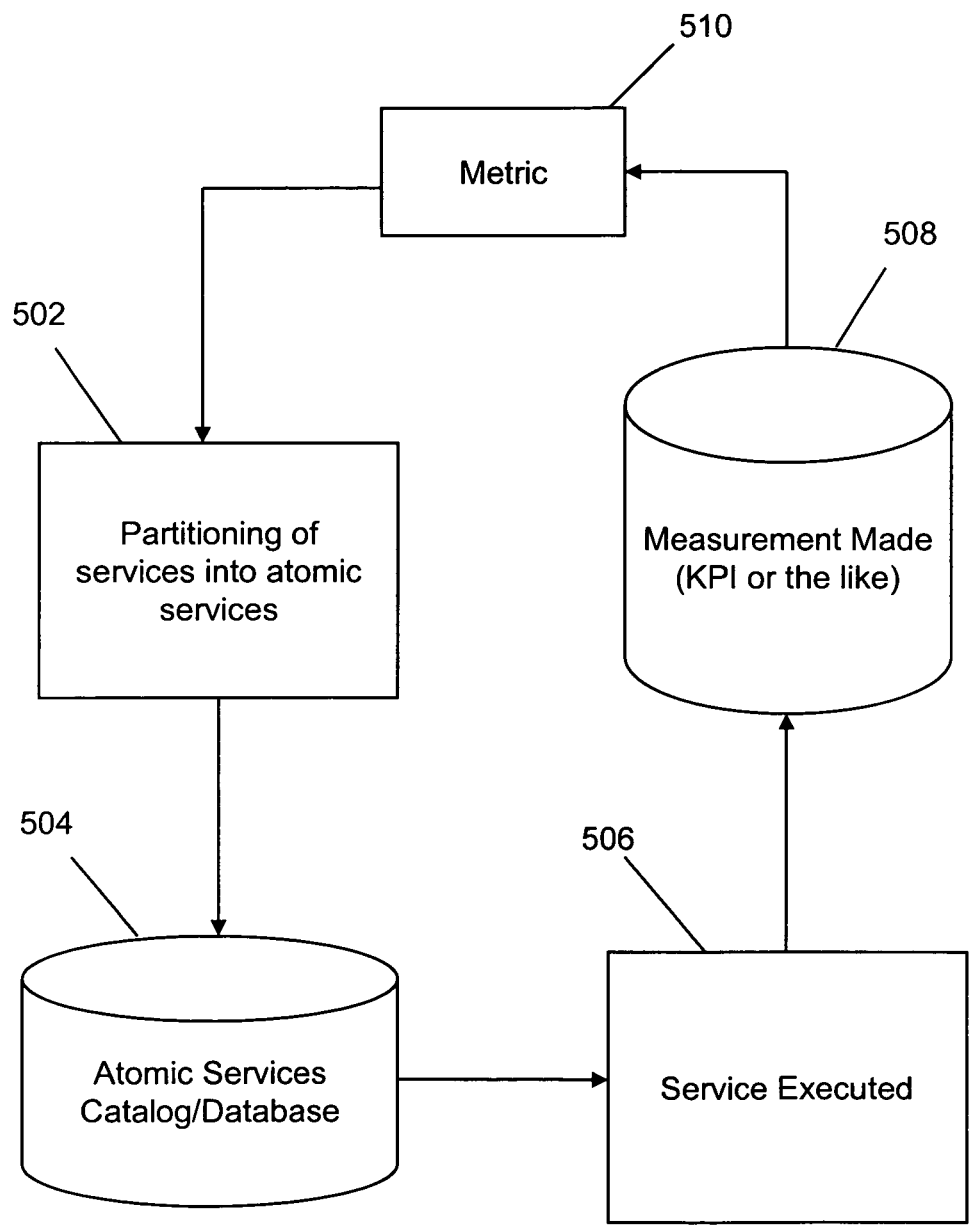

FIG. 2. illustrates an exemplary implementation of the method of the present invention as outlined in FIG. 1B;

FIG. 3 illustrates a flowchart of an exemplary embodiment of an atomic services identification, partitioning and delivery method according to the present invention;

FIG. 4 illustrates a block diagram of an exemplary embodiment of a atomic services system according to the present invention; and FIG. 5 illustrates a flowchart of an exemplary embodiment of a feedback loop for refining the atomic services decision method according to the present invention.

V. DETAILED DESCRIPTION OF THE DRAWINGS

The present invention will be described in an information technology (IT) services environment and its advantages are best understood by referring to FIGS. 1A-5. In the IT services environment, employee duties or "services" may be partitioned into smaller, standardized, and reusable pieces called "atomic services". The partitioning of services allows service providers to optimize efficiencies when delivering services. By partitioning employee duties into these atomic services provides companies with a means of more efficiently matching service providers with requested services.

Atomic services are instrumental in allowing companies to utilize their global pool of services. The atomic services business model shifts work from the standard team approach towards delivering services to distribute work based on a variety of considerations designed to increase efficiency. These considerations include but are not limited to competencies, such as skill and experience, location, availability, security, costs and contractual considerations.

An example of a company utilizing atomic services to increase efficiencies is as follows: Company X receives an order for a "computer setup". Instead of deploying a geographically/centrally located team to fulfill the order, Company X partitions the standardized tasks in the project (computer setup) to service providers to match service provider skills with the tasks required to fulfill the order. So for the requested computer setup, Company X might partition the varying tasks as follows:

Operating system setup performed by a service provider in Texas

Network connection configuration done by a service provider in New York

Software A installation performed by a service provider in Brazil

Software B installation performed by a service provider in India

This allows Company X to utilize its global services pool to fill the order, instead of relying on all members of a geographically located team to have the required skills needed or to all be available at the same time, for instance.

The function of partitioning or breaking down services into atomic services may be performed by a variety of sources and may include, for example, services coordinators, subject matter experts, account managers, an automated process, etc. However, in order to partition services into atomic services, those services must first be identified. Therefore, it becomes necessary to identify the correct boundaries for service elements so that they may be logically and efficiently partitioned. The present invention provides a reliable and efficient means of identifying and utilizing atomic services for service delivery.

For the purposes of the detailed description of the present invention, the following definitions are intended: "work" is related to the delivery of IT services, including IT systems management, server management, software installation, etc.; "entity" refers to a variety of end users of IT services, including customers, suppliers, distributors, companies, teams, individuals, etc.; "true" is intended to be synonymous with "yes"; and "false" is intended to be synonymous with "no".

FIG. 1A illustrates an exemplary high-level method according to the invention. The method begins with dividing a project into individual tasks based on a first consideration, 102. Examples of the first consideration include logical boundaries based on team, subteam, and skill that are utilized for performing a task and maximization of efficiencies to increase the options for combining atomic services. The individual tasks are designated as atomic services, 104. Once the atomic service is identified, it is placed into a catalog for later use, 106. Additional considerations may be used in dividing a project into individual tasks including location, availability, security, cost, whether the task is performed by a team or individual, and whether there can be different entities that are capable of performing the task. In at least one embodiment, the method includes identifying service providers capable of providing the partitioned atomic services and including them in the catalog with a cross-reference or other mapping occurring between the service providers and the atomic services to facilitate determining who will perform the required service and assist in projecting time and costs for providing a service.

Another high-level method according to the invention for identifying and partitioning a service into at least one atomic service begins with dividing a project into individual tasks. To see if the tasks need to be divided any further, it is confirmed that the individual tasks can not be separated further. The resulting tasks are converted into respective atomics services, which are placed into an atomic services catalog.

In order to break an information technology project into atomic services, it is necessary to first identify the service boundaries so that the services can be partitioned, divided and packaged into atomic services. FIG. 1B illustrates a flowchart outlining an overview of an exemplary method of the present invention for performing these functions. First, as shown in 152, it is helpful to determine whether the work required to perform the information technology service can be automated. If the entire work can be automated, that work can be directly encapsulated as an atomic service and provided to a catalog or database for use as an atomic service.

However, where the entire work required to perform the IT service cannot be automated, it must be determined whether all tasks to perform the work can be performed by one person, or a team having accountability and ownership of the tasks, or a team having one or more logical subteams based on skills, as shown at 154. Based on the determination of who can perform the work, the work is partitioned to match the different skills required to perform different tasks in the work, as shown at 156. The tasks may then be further divided into specializations within the team, subteam or skill set, as shown at 158. The tasks are then encapsulated into atomic services, as shown at 160, and delivered into an atomic services catalog, as shown at 162. These generalized steps will be discussed later in greater detail with respect to FIG. 3.

FIG. 2 illustrates an example of how the product of the method illustrated in FIG. 1B might be utilized. First, an entity requests a service to be performed by placing an order, at 202. The request for service could be in a variety of formats, including internet order/purchase, email request, phone order, etc. After the order is received, at 204, an account manager, for example, reviews the order and any related contracts or requirements from the requesting entity. The order is then placed with a service coordinator who creates a service order or project, at 206. The project is then created by selecting services from a list of available services or by an automated process. The atomic services system 200 receives the request and combines the appropriate atomic services 210 from a catalog (or database) 212 needed to fulfill the order or complete the project.

The method of identifying and partitioning atomic services is described with respect to flowchart 300 of FIG. 3. Flowchart 300 outlines a series of decisions that are made to divide or partition work into smaller atomic services. When partitioning work into atomic services, the method starts at step 302. The method proceeds to step 304 and determines whether the entire work to perform an IT service can be automated. If step 304 is true, the method proceeds to step 306 and encapsulates all tasks related to a partitioned service into an atomic service. The encapsulation steps 306, 320, 332, and 334 are the same in the illustrated method of FIG. 3. The method would then end at step 308 and the atomic service would be ready for inclusion in the atomic services catalog 402.

If step 304 is false, the method proceeds to step 310 and determines whether all tasks can be performed by one person. If step 310 is true, the method proceeds to step 312 and determines whether all the work can be partitioned to match the different skills required to perform different sections in the work. If step 312 is false, the method proceeds to step 306 and encapsulates all tasks into an atomic service. The method would then end at step 308 and the atomic service would be ready for inclusion in the atomic services catalog 402.

If step 312, which asks, "Can the work be partitioned to match the different skills required to perform different sections in the work?" is true, the method proceeds to step 340 and the work is partitioned into smaller pieces or chunks based on criteria, such as team, subteam, skill, etc. The division of a service in step 340 allows for a level of subjective analysis of a particular service in at least one embodiment, and as such can increase the granularity that is possible with this invention. Step 340 in at least one embodiment provides an efficient way to expedite the analysis and partitioning of services into atomic services, for example, the computer installation example above. Once the work is partitioned into smaller pieces at step 340, the method returns to step 304 and determines whether the entire work to perform an IT service can be automated. The determination at step 304 is performed for each piece that is partitioned at step 340.

If step 310, which asks, "Can all tasks be performed by one person?" is false, the method proceeds to step 314 and determines whether all tasks are performed by a single team. If step 314 is true, the method proceeds to step 316 and determines whether the team has logical subteams based on skills. If step 316 is false, the method proceeds to step 318 and determines whether the work can be partitioned to match different skills required to perform different sections in the work. If step 318 is true, the method proceeds to step 340 and partitions the work into smaller pieces based on team, subteam, skill, etc. The method then determines, at step 304, whether the entire work to perform an IT service can be automated for each piece output by step 340. If step 318 is false, all the tasks are encapsulated into an atomic service at step 320 and output at step 322 for inclusion into the atomic services catalog 402.

If step 316, which asks, "Does the team have logical subteams based on skills?" is true the method proceeds to step 326 and determines whether the tasks are performed by different subteams. If step 326 is true, the method proceeds to step 340 and the work is partitioned into smaller pieces. The method would then proceed to step 304 and perform the functions as outlined above. If step 326 is false, the method would proceed to step 330 and determine whether the work can be partitioned to match the different skills required to perform different sections in the work. If step 330 is true, the method proceeds to step 340. If step 330 is false, all tasks are encapsulated into an atomic service at step 334 and output at step 336 for inclusion into the atomic services catalog 402.

If step 314, which asks, "Are all tasks performed by a single team?" is false the method proceeds to step 324 and determines whether one team is accountable and has clear ownership of the tasks. If step 324 is false, the method proceeds to step 340. If step 324 is true, all tasks are encapsulated into an atomic service at step 328 and output at step 332 for inclusion into the atomic services catalog 402.

The steps of method 300 continue until all services are partitioned into the smallest possible pieces based on the team, subteam, skill, etc. Once all services have been partitioned into the smallest possible pieces based on the set criteria, the method ends and all results are stored in (or delivered to) the atomic services catalog 402.

One of ordinary skill in the art will appreciate based on this disclosure that the steps illustrated in FIG. 3 may be rearranged in a variety of ways. One exemplary rearrangement would be to put step 340 as an initial step.

The various methods described above may be combined with a method that identifies service providers capable of performing the atomic services. Once a service provider is identified, adding (or storing) them in the atomic service catalog, for example, in the service provider capability database. The database in at least one exemplary embodiment is related (or linked) to the atomic services database to allow the service providers to be used. The service provider capability database in at least one exemplary embodiment includes an interface definition for how to communicate with the particular service provider.

FIG. 4 illustrates an exemplary system for delivering atomic services. As shown therein, atomic services system includes an atomic services catalog 402 and an integration services bus 410 that provide atomic services output 414, 416 as illustrated in FIG. 4. Atomic services catalog 402 is a system, such as a database, file or list, that includes all available atomic services and identification of a service providers who perform at least one atomic service. Atomic services catalog 402 may include a list of service provider capabilities 404 along with atomic service definitions (or descriptions) 406. The service provider capabilities 404 are a compilation of which service providers can perform an atomic service and in at least one embodiment include an interface definition for how to reach and/or communicate with the service provider. The atomic service definitions 406 are the result of the atomic services as partitioned by the method of the present invention and outlined above with respect to FIG. 3.

As discussed above, the atomic services catalog 402 may be a database. The service provider capabilities 404 and atomic service definitions 406 may be stored in the database and mapped and cross-referenced in order to match the service provider capabilities 404 with the atomic service definitions 406. The matching or bundling of service provider capabilities 404 and atomic service definitions 406 may be based on a variety of considerations, for example, overall efficiency, skill, location, availability, etc.

Once entered into the atomic services catalog 402, atomic services may be matched or bundled in several ways, including in a predefined manner, manually, or based on policy. Predefined bundling of atomic services may be automated to be performed by the integration services bus 410 based on set rules that determine which services are to be performed by which service provider 414, 416. Manual bundling of services may be performed by a person, such as a service coordinator, account administrator, account manager, etc., who determines what services are needed to fulfill a service request. Policy bundling is performed based on a set of policy related criteria, such as security considerations, special customer requirements or requests, etc.

A system makes use of the atomic services catalog 402 to communicate with its service providers 414, 416. The system allocates an atomic service 406 to a service provider based on the enterprises' business process and service provider's capability 404. The system generates a message to "fulfill" an atomic service using service provider independent Web Services Definitions Language (WSDL) 408. The system puts the message on an integration services bus 410. The integration services bus transforms the message into the Web Services Definitions Language (WSDL) 412 of the appropriate target system 414, 416.

Service providers may optionally receive notifications to which they may respond with availability. This helps to ensure that services are reliably provided in a timely fashion. Once tasks are performed the service provider would notify the account manager.

The atomic services catalog 402 may also be updated to refine the atomic services through actual use of the atomic services system 400. The actual use of the atomic services catalog 402 may utilize mathematical techniques, such as algorithms, to track and update the granularity and performance of the atomic services. These algorithms may incorporate metrics, such as key performance indicators (KPIs) that are designed to reflect strategic value drivers that are defined by executives. These metrics can be designed to continually or periodically update based on a feedback loop. Metrics may be designed to measure a variety of parameters and allows each service to be analyzed to increase efficiencies. Service order metrics, for example, may be designed to measure turnaround time to process orders, minimum and maximum time to fulfill orders, quality of services provided, time to market for a particular service, etc. These metrics may also be sortable. These metrics in at least one embodiment help to further define competencies and the competencies help define boundaries by sending requested services to appropriate specialists.

An exemplary embodiment of a feedback loop that may be practiced with the present invention is outlined in FIG. 5. Feedback loop 500 may be utilized to update and refine the previously determined atomic services. The loop begins with an algorithm 502, for example, but may also utilize other known mathematical and business techniques for providing a measurement of system performance. The algorithm 502 is input into atomic services database 504 in order to track the performance of the atomic services requested and provided. When the service is executed at 506 a measurement of that service is made at 508 by a KPI or the like. The measurement of the service provided based on the defined metric is updated and output at 510. This updated metric 510 may then be fed back into the algorithm 502 to help update and refine the atomic services.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer.

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary embodiments described above can be configured without departing from the scope and spirit of the invention. Therefore, it is to be understood that, within the scope of the appended claims, the invention may be practiced other than as specifically described herein.

VI. Industrial Applicability

The above-described invention is useful for identifying, partitioning, and delivering atomic services in an information technology (IT) environment. Identifying and partitioning services based on natural service boundaries allows atomic services to be standardized and reused as needed. The standardization and storage of services diminishes the effects of the loss of knowledge due to employee attrition. The invention is particularly useful in providing a method and system for the automated bundling and delivery of services based on competencies which allows for increased efficiency.

We claim:

1. A method for identifying and partitioning a service into at least one atomic service in an environment to fulfill information technology services, the method comprising:
   determining whether the entire work to perform at least one of an information technology service and smaller tasks can be automated;
   determining whether all tasks can be performed by one person when the entire work to perform said information technology service cannot be automated;
   determining whether the entire work can be partitioned to match different skills required to perform different sections in the entire work when all tasks can be performed by one person;
   dividing the entire work into the smaller tasks with a processor based on at least one of
      different skills required to perform different sections of the entire work, and subteams required to perform the entire work;
   determining whether all tasks can be performed by one team when all tasks cannot be performed by one person;
   encapsulating at least one of all tasks and the smaller tasks into at least one atomic service with the processor when the entire work to perform at least one of said information technology service and the smaller tasks can be automated; and
   storing the at least one atomic service in an atomic services catalog.

2. The method according to claim 1, wherein said dividing the entire work into the smaller tasks is performed responsive to a determination that the work can be partitioned to match the different skills required to perform different sections in the work.

3. The method according to claim 1, further comprising:
   encapsulating said work into an atomic service responsive to a determination that said work cannot be partitioned to match the different skills required to perform different sections in the work, and
   storing the encapsulated tasks in an atomic services catalog.

4. The method according to claim 1, further comprising:
   determining whether said team has logical subteams based on skills responsive to a determination that all tasks can be performed by one team.

5. The method according to claim 4, further comprising:
   determining whether the work can be partitioned to match the different skills required to perform different sections in the work responsive to a determination that said team does not have logical subteams based on skills.

6. The method according to claim 5, further comprising:
   dividing said work into smaller tasks based on skills required to perform said work responsive to a determination that said work can be partitioned to match the different skills required to perform different sections in said work.

7. The method according to claim 4, further comprising:
   determining whether tasks are performed by different subteams responsive to a determination that said team has logical subteams.

8. The method according to claim 7, further comprising:
   determining whether the work can be partitioned to match the different skills required to perform different sections in the work responsive to a determination that tasks are not performed by different subteams.

9. The method according to claim 8, further comprising:
   dividing the work into smaller tasks based on subteams required to perform the work responsive to a determination that said work can be partitioned to match the different skills required to perform different sections in the work;
   determining whether the entire work to perform said smaller tasks can be automated;
   encapsulating all the smaller tasks into atomic services responsive to a determination that said work can be automated; and
   storing said atomic services in an atomic services catalog.

10. The method according to claim 8, further comprising:
    encapsulating the work into an atomic service responsive to a determination that said work cannot be partitioned to match the different skills required to perform different sections in the work, and
    storing the encapsulated tasks in an atomic services catalog.

11. The method according to claim 1, further comprising:
    determining whether said team is accountable for and has clear ownership of said tasks responsive to a determination that the tasks are performed by one team.

12. The method according to claim 11, further comprising:
    dividing the work into smaller tasks based on teams required to perform the work responsive to a determination that said team is not accountable for or does not have clear ownership of said tasks;
    determining whether the entire work to perform said smaller tasks can be automated;
    encapsulating said smaller tasks into atomic services responsive to a determination that said work can be automated; and
    storing said atomic services in an atomic services catalog.

13. The method according to claim 11, further comprising:
    encapsulating all the smaller tasks into atomic services responsive to a determination that said team is not accountable for or does not have clear ownership of said tasks; and
    delivering said atomic services into an atomic services catalog.

14. A method for identifying and partitioning a service into at least one atomic service in an environment to fulfill information technology services, the method comprising:
    determining whether an entire work to perform at least one of an information technology service and smaller tasks can be automated;
    determining whether all tasks can be performed by one person when the entire work to perform said information technology service cannot be automated;
    determining whether the entire work can be partitioned to match different skills required to perform different sections in the entire work when all tasks can be performed by one person;

determining whether all tasks to perform the entire work can be performed by one team when all tasks cannot be performed by one person, the team having accountability and ownership of all tasks or said team having one or more logical subteams based on skills;

partitioning the entire work into the smaller tasks with a processor to match the different skills required to perform different tasks in the entire work, said partitioning based on the logical subteams;

dividing all tasks into specializations based on team, subteam or skill;

encapsulating at least one of all tasks and the smaller tasks into atomic services with the processor when the entire work to perform at least one of said information technology service and the smaller tasks can be automated; and storing said atomic services in an atomic services catalog.

15. The method according to claim 14, wherein said dividing the entire work into the smaller is performed responsive to a determination that the work can be partitioned to match the different skills required to perform different sections in the work.

16. The method according to claim 14, further comprising:
encapsulating said work into an atomic service responsive to a determination that said work cannot be partitioned to match the different skills required to perform different sections in the work, and storing the encapsulated tasks in an atomic services catalog.

17. The method according to claim 14, further comprising:
determining whether said team has logical subteams based on skills responsive to a determination that all tasks can be performed by one team.

18. The method according to claim 17, further comprising determining whether the work can be partitioned to match the different skills required to perform different sections in the work responsive to a determination that said team does not have logical subteams based on skills.

19. The method according to claim 18, further comprising dividing said work into smaller tasks based on skills required to perform said work responsive to a determination that said work can be partitioned to match the different skills required to perform different sections in said work.

20. The method according to claim 17, further comprising determining whether tasks are performed by different subteams responsive to a determination that said team has logical subteams.

21. The method according to claim 20, further comprising:
determining whether the work can be partitioned to match the different skills required to perform different sections in the work responsive to a determination that tasks are not performed by different subteams.

22. The method according to claim 21, further comprising:
dividing the work into smaller tasks based on subteams required to perform the work responsive to a determination that said work can be partitioned to match the different skills required to perform different sections in the work;

determining whether the entire work to perform said smaller tasks can be automated;

encapsulating all the smaller tasks into atomic services responsive to a determination that said work can be automated; and storing said atomic services in an atomic services catalog.

23. The method according to claim 21, further comprising:
encapsulating the work into an atomic service responsive to a determination that said work cannot be partitioned to match the different skills required to perform different sections in the work, and storing the encapsulated tasks in an atomic services catalog.

24. The method according to claim 14, further comprising determining whether said team is accountable for and has clear ownership of said tasks responsive to a determination that the tasks are performed by one team.

25. The method according to claim 24, further comprising:
dividing the work into smaller tasks based on teams required to perform the work responsive to a determination that said team is not accountable for or does not have clear ownership of said tasks;

determining whether the entire work to perform said smaller tasks can be automated;

encapsulating said smaller tasks into atomic services responsive to a determination that said work can be automated; and storing said atomic services in an atomic services catalog.

26. The method according to claim 24, further comprising:
encapsulating all the smaller tasks into atomic services responsive to a determination that said team is not accountable for or does not have clear ownership of said tasks; and delivering said atomic services into an atomic services catalog.

* * * * *